(12) United States Patent
Lin

(10) Patent No.: US 6,606,050 B2
(45) Date of Patent: Aug. 12, 2003

(54) REMOTE CONTROL DEVICE HAVING CLASSIFIED CHANNELS

(75) Inventor: Chih-Shiuh Lin, Chong Ho (TW)

(73) Assignee: Cheng Han Technology Co., Ltd., Taipei (TW)

(*) Notice: Subject to any disclaimer, the term of this patent is extended or adjusted under 35 U.S.C. 154(b) by 216 days.

(21) Appl. No.: 09/761,021

(22) Filed: Jan. 14, 2001

(65) Prior Publication Data

US 2002/0093449 A1 Jul. 18, 2002

(51) Int. Cl.[7] ................................................ G08C 19/16
(52) U.S. Cl. .................. 341/176; 348/734; 340/865.72; 359/142
(58) Field of Search ................................. 341/173, 176; 348/734; 340/825.69, 825.72; 359/142, 146

(56) References Cited

U.S. PATENT DOCUMENTS 5,414,426 A * 5/1995 O'Donnell et al. ......... 341/176
5,938,655 A * 8/1999 Bisch et al. .................. 606/1

* cited by examiner

Primary Examiner—Michael Horabik
Assistant Examiner—Albert K. Wong

(57) ABSTRACT

A remote control device includes a housing having one or more buttons, a processor unit received in the housing, and a memory coupled to the processor unit. The groups of required or selected channels may be selectively entered into the memory with keys or buttons, and the entered or selected groups of channels may then be easily and quickly controlled and selected by the button. For example, the movie channels and/or the news channels, and/or the sports channels may be stored in the memory and may be easily and quickly selected with the selected buttons.

4 Claims, 6 Drawing Sheets

REMOTE CONTROL DEVICE HAVING CLASSIFIED CHANNELS

BACKGROUND OF THE INVENTION

1. Field of the Invention

The present invention relates to a remote control device, and more particularly to a remote control device having one or more keys to select the required or the predetermined classified channels easily.

2. Description of the Prior Art

Typical remote control devices, particularly the remote control devices for controlling the televisions, include an up (^) key and a down (v) key to change the channels in series and to select the required channels one by one. For example, when the present channel is 23rd channel, and the user is going to choose the 38th channel, the user have to depress the up (^) key 15 times in order to reach the 38th channel. The users may also use the keys from 0–9 in order to directly select the required channel. However, the users have to select many of the channels before they may select the required channel.

The present invention has arisen to mitigate and/or obviate the afore-described disadvantages of the conventional remote control devices.

SUMMARY OF THE INVENTION

The primary objective of the present invention is to provide a remote control device including one or more keys to select the required or the predetermined classified channels easily, the selected groups of channels may be stored in the memory and may be easily and quickly selected with a key or button.

In accordance with one aspect of the invention, there is provided a remote control device comprising a housing including at least one button provided thereon, a processor unit received in the housing, a memory received in the housing and coupled to the processor unit, means for entering selected channels into the memory and to be controlled and selected by the button. The group or selected or classified channels may thus be easily and quickly selected.

An infrared emitting unit is further provided and coupled to the processor unit and includes a transistor having a collector coupled to a diode and a first resistor, a second resistor coupled parallel to the diode and the first resistor and coupled to a base of the transistor, and a third resistor coupled to the base of the transistor.

A power unit and a low voltage detecting unit are further provided and coupled to the processor unit. A channel control unit is further provided and coupled to the processor unit and includes four pairs of diodes and resistors coupled parallel to each other and coupled to the processor unit.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
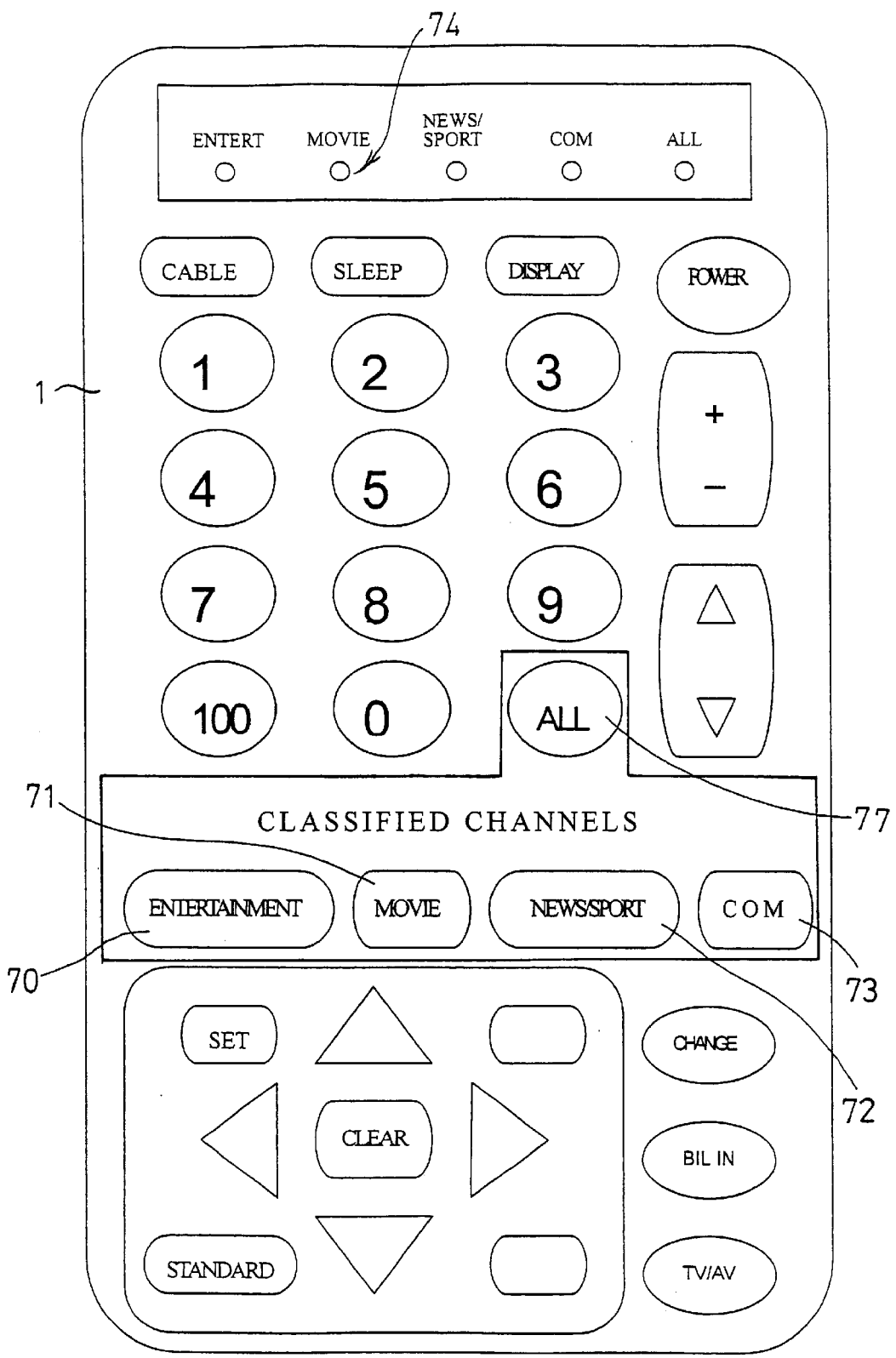
FIG. 1 is a plane view of a remote control device in accordance with the present invention.
Figure 2:
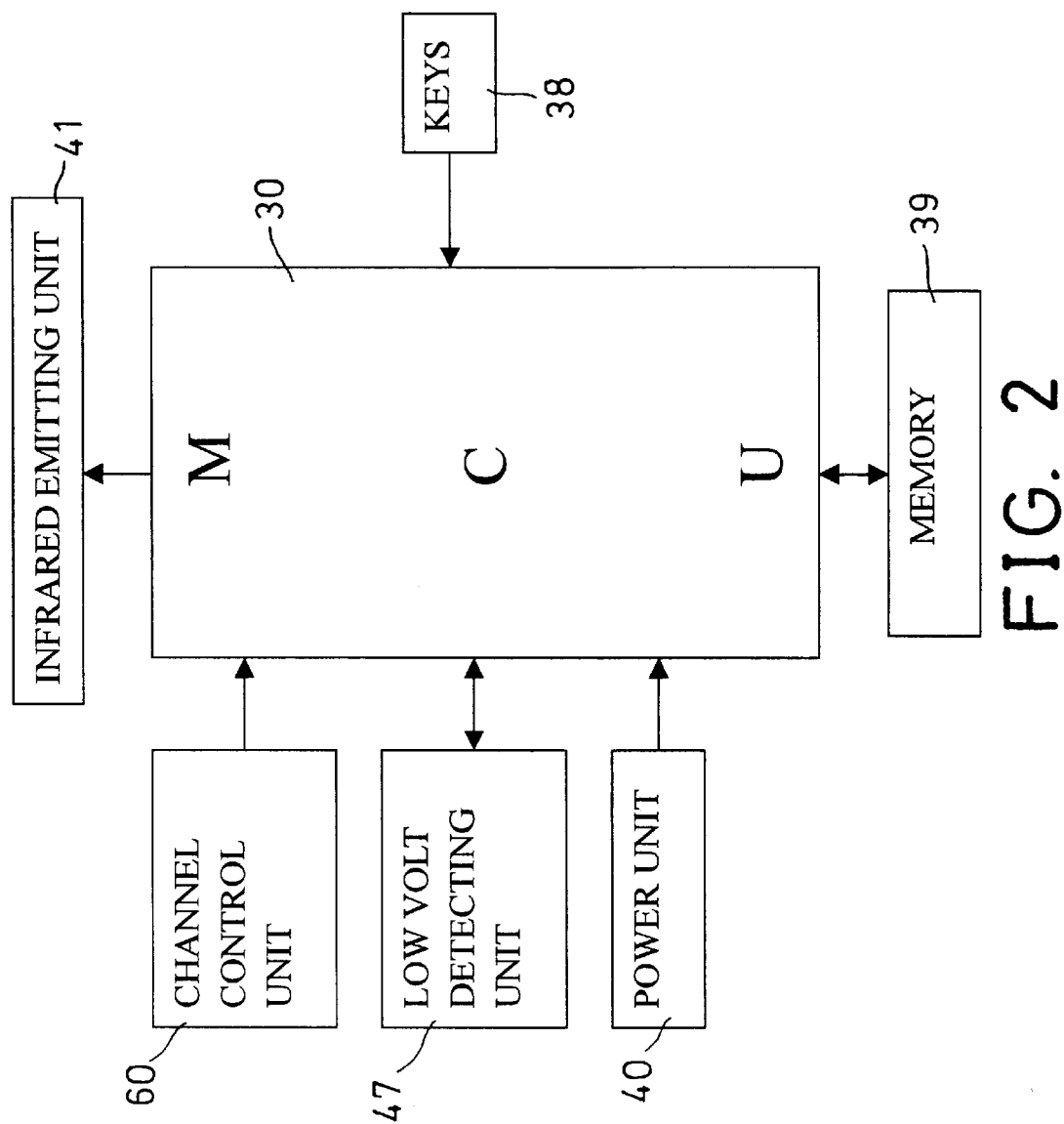
FIG. 2 is a block diagram illustrating the devices or the members of the remote control device.
Figure 3:
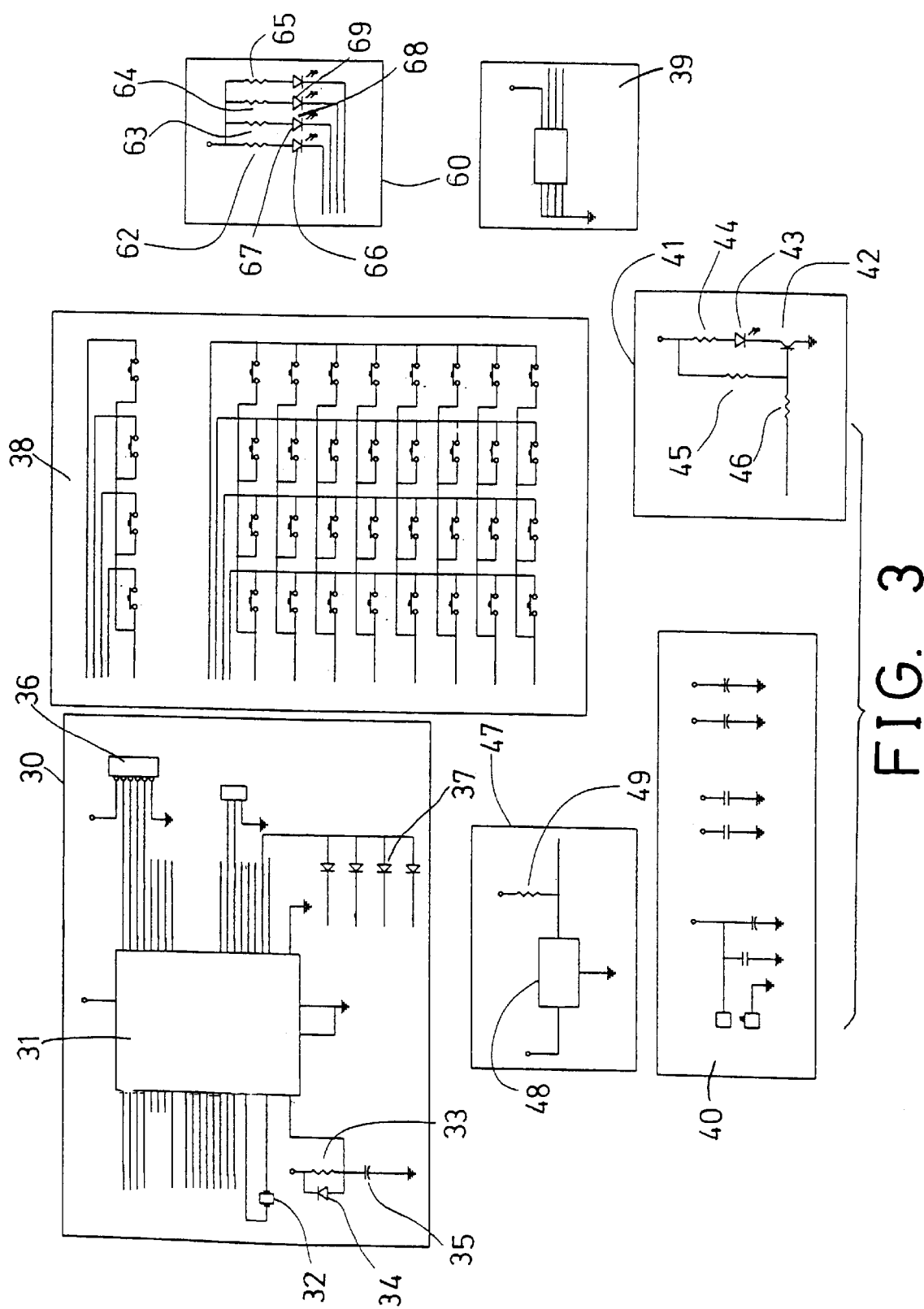
FIG. 3 is a block diagram showing the circuits for the devices or the members of the remote control device.

Referring to the drawings, and initially to FIGS. 1–3, a remote control device in accordance with the present invention comprises a housing 1 including a processor unit, such as a microprocessing unit (MCU) 30 disposed or provided therein. As shown in FIG. 3, the MCU 30 includes a microprocessor 31, a quartz oscillator 32 coupled to the microprocessor 31 for timing purposes, a resistor 33 and a diode 34 coupled parallel to each other and coupled in series to a capacitor 35 for forming a resetting circuit, and a liquid crystal displayer 36 and one or more diodes 37 coupled to the microprocessor 31. The housing 1 includes a number of keys 38 provided therein and coupled to the MCU 30 for adjusting the volume or for selecting the required channels or for entering the required information to the MCU 30 in order to control the MCU 30.

A memory 39, a power unit 40, and infrared emitting unit 41, a low voltage detecting unit 47, and a channel control unit 60 are coupled to the MCU 30. The memory 39 may be an erasable memory. The power unit 40 may include one or more batteries disposed therein for energizing the remote control device. The infrared emitting unit 41 may be used to emit an infrared control signal and includes a transistor 42 having a collector coupled in series to a diode 43 and a resistor 44, a resistor 45 coupled parallel to the diode 43 and the resistor 44, and another resistor 46 coupled to the resistor 45 and coupled to the base of the transistor 42. The low voltage detecting unit 47 may be used to detect the voltage of the batteries in the power unit 40 and includes an integrated circuit 48 coupled to a resistor 49, in order to generate and transmit a warning signal to the MCU 30 when the batteries have been decreased to the predetermined low voltage. The channel control unit 60 includes four resistors 62, 63, 64, 65 coupled in series with four diodes 66, 67, 68, 69 respectively, and the four pairs of resistor 4s 62–65 and diodes 66–69 are then coupled parallel to each other and coupled to the MCLX 30, for indicatine the channels entering into or deleted from the memory 39, for example. The diodes 66–69 may be the light crystal displayers or the light emitting diodes (LED).

The housing 1 includes one or more buttons 70, 71, 72, 73 for representing and for collecting and for selecting the required or the predetermined or the classified channels, and includes one or more light devices 74 provided therein for indicating the operation of the buttons 70–73. For example, the similar channels for such as entertainment may be selected and stored in one of the buttons 70 which may then be used to select only the classified and the selected and the predetermined entertainment channels. The movie channels may be selected and stored in another button 71 which may then be used to select only the classified and the selected and the predetermined movie channels. The news and/or sports channels may be selected and stored in a further button 72 which may then be used to select only the classified and the selected and the predetermined news and/or sports channels. The combined channels may be selected and stored in another button 73 which may then be used to select only the classified and the selected and the predetermined combined channels. The housing 1 may include a further button 77 to select all of the channels instead of the classified channels.

Figure 4:
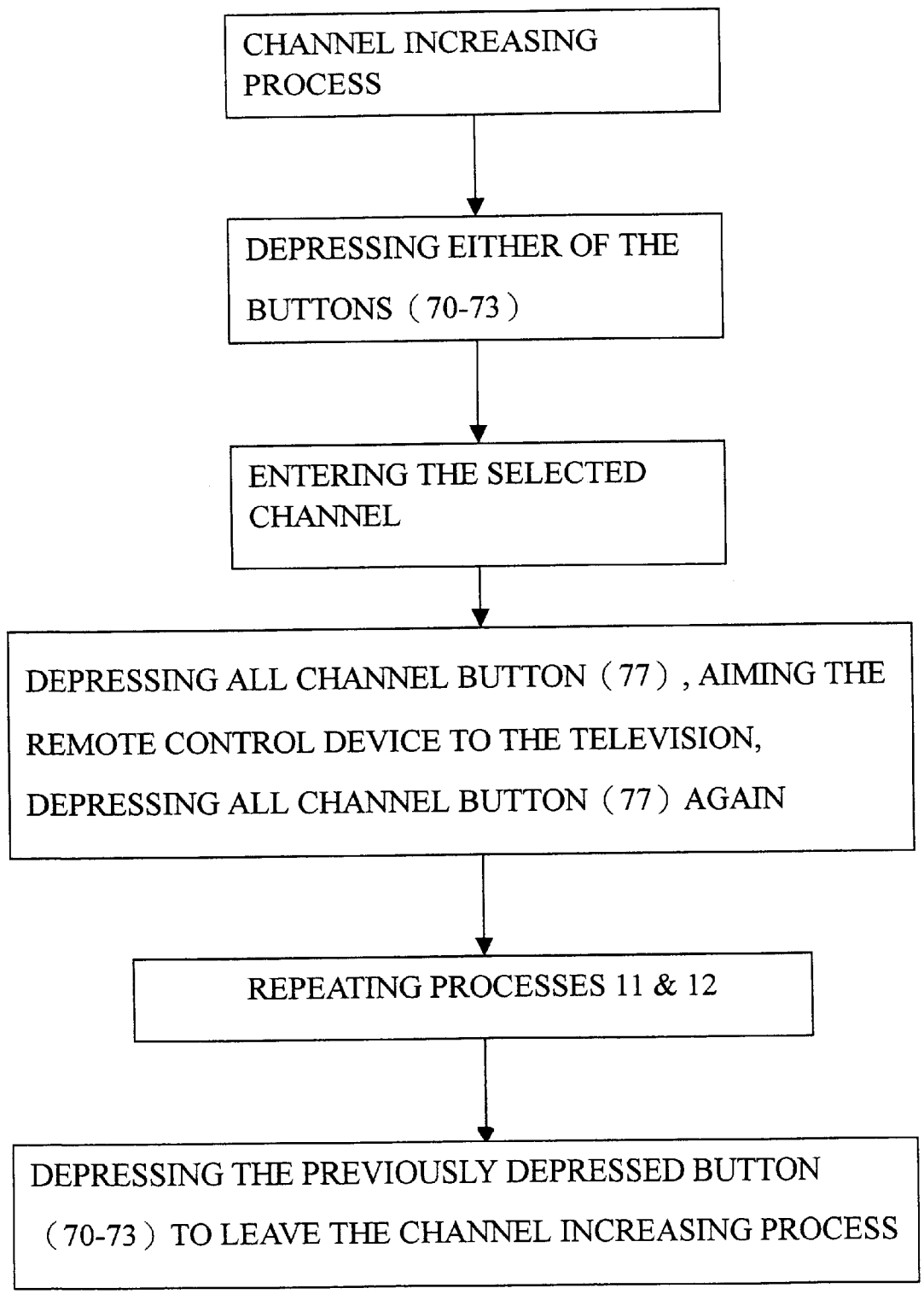
FIGS. 4, 5, 6 are flow charts showing the channel increasing processes, the channel deleting processes, and the classified channels deleting processes, respectively.

Referring next to FIG. 4, illustrated are the processes for adding or increasing the channels in the selected or classified groups of channels. First, either of the buttons 70–73 is depressed (10) to select the required groups of channels. The button 70 is for entertainment channels, the button 71 is for movie channels, the button 72 is for news and sports channels, and the button 73 is for the other channels, such as the combination channels. For example, when the movie button 71 is depressed, the light device 74 for the movie channels will be energized and/or flashed. The user may then enter (11) the selected movie channel by the keys 38, and may then depress the all channel button 77, and aim the remote control device to the television, and then depress the all channel button 77 again to confirm the adding of the selected or the entered channel. The light device 74 may flash when the adding of the channel is completed and confirmed. If the light device 74 do not flash or if the channel has been wrongly entered, the user may enter the correct channel again. The user may repeat (13) the processes (11) and (12) until all the required or selected channels have been added. The newly added channels may be memorized or stored in the memory 39. After all of the required channels have been added, the movie button 71 is depressed again (14) in order to leave the channel increasing processes. The light device 74 for movie channels may be turned off when leaving the channel increasing processes.

Figure 5:
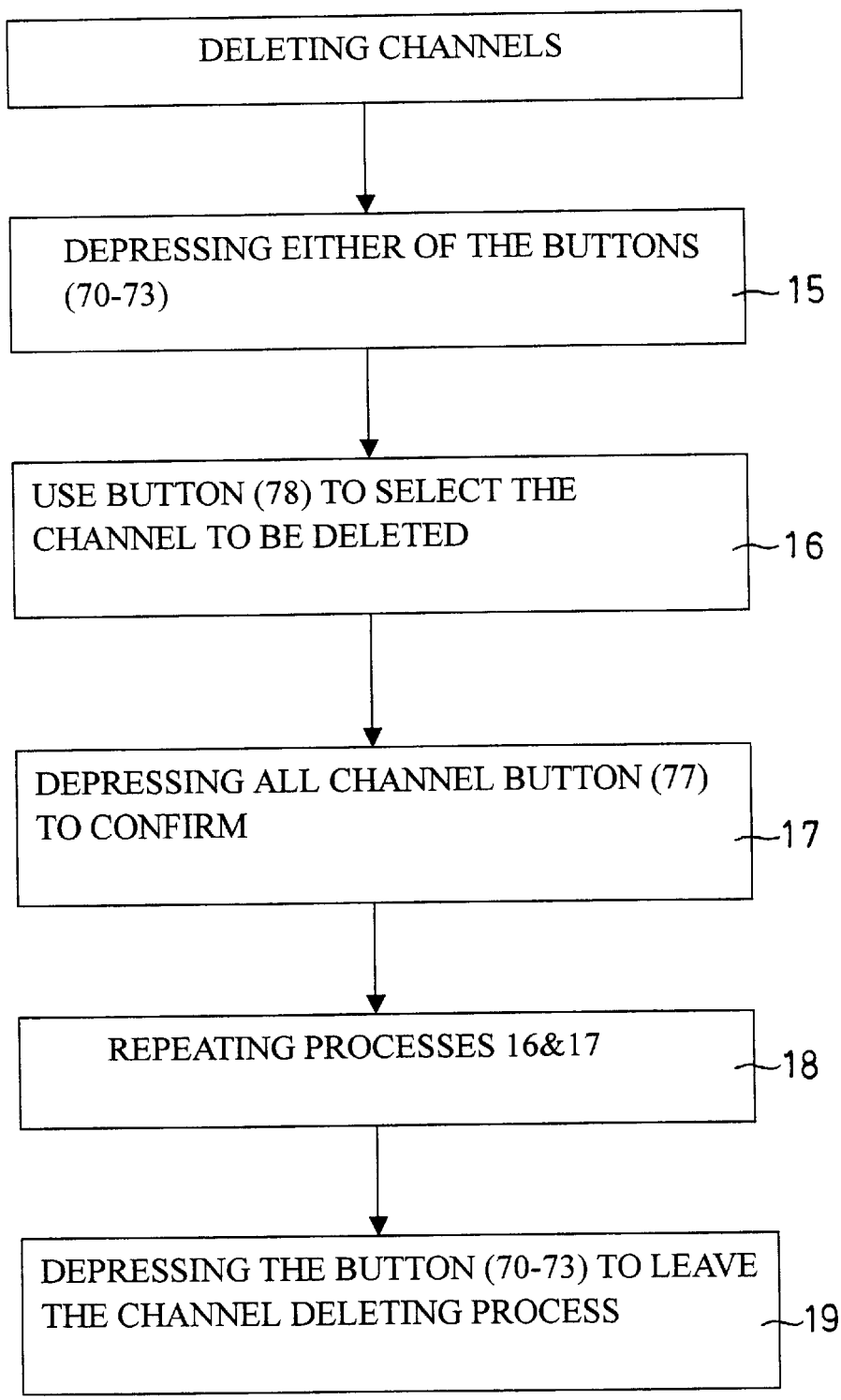

Referring next to FIG. 5, illustrated are the processes for deleting the channels in the selected or classified groups of channels. First, either of the buttons 70–73 is depressed (15) to delete one of the channels that have previously been added therein. For example, when the movie button 71 is depressed, the light device 74 for the movie channels will be energized and/or flashed. The user may then move (16) to the selected movie channel that is to be deleted by the button 78, and may then depress (17) the all channel button 77 to confirm the deleting of the selected channel. The light device 74 may flash when the deleting of the channel is completed and confirmed. If the light device 74 do not flash or if the channel has not been deleted, the user may select the correct channel to be deleted again. The user may repeat (18) the processes (16) and (17) until all the selected channels have been deleted. The deleted channels may also be memorized or stored in the memory 39. After all of the required channels have been deleted, the movie button 71 is depressed again in order to leave the channel deleting processes. The light device 74 for movie channels may also be turned off when leaving the channel deleting processes.

Figure 6:
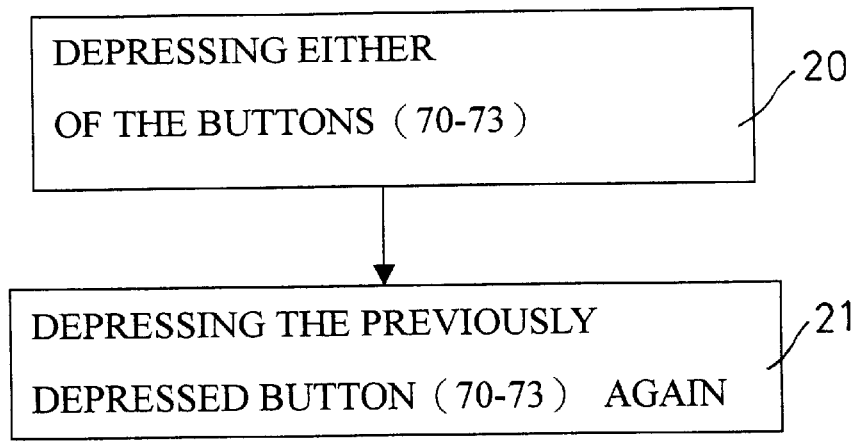

Referring next to FIG. 6, when it is required to delete all the previously added channels in one of the classified groups of channels, for example, when all of the previously added news and sports channels are to be deleted, the news and sports button 72 is depressed and the light device 74 for the news and sports channels will be energized, and then the news and sports button 72 is depressed again such that the channels stored in the news and sports button 72 will all be deleted. The light device 74 for the news and sports channels will be turned off when all of the channels stored in the news and sports button 72 have all been deleted.

Figure 7:
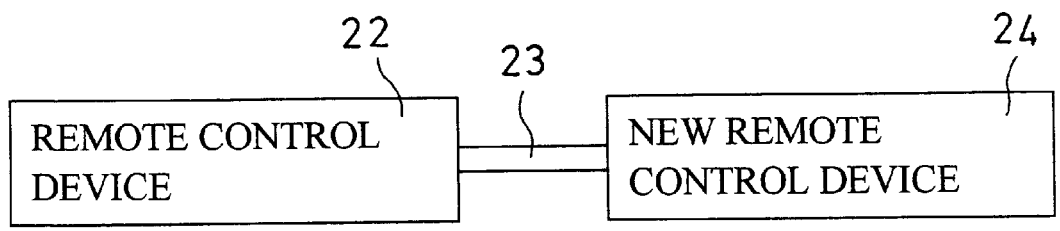
FIGS. 7 and 8 are block diagrams illustrating the processes to copy the remote control device.
Figure 8:
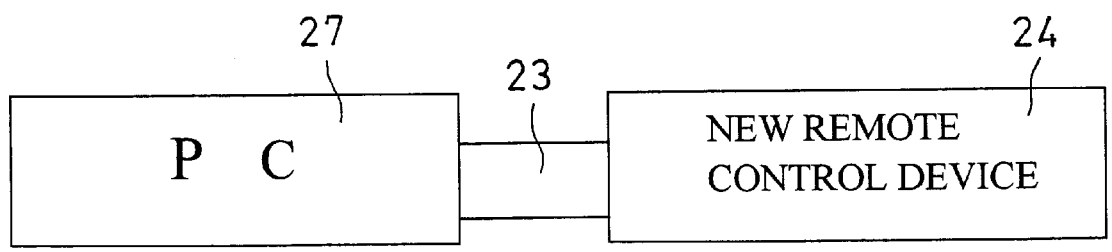

Referring next to FIG. 7, the data or the information stored in the remote control device 22 may be directly transmitted to the other new remote control device 24 with cables 23 or the like. Referring next to FIG. 8, the data or the information stored in the remote control device 22 may also be transmitted to a personal computer 27 which may then be transmitted to the other new remote control device 24 with cables 23 or the like.

It is to be noted that the selected entertainment channels may be introduced or added into the memory 39 and may be easily and quickly selected by the entertainment button 70. Similarly, the selected movie channels may be introduced or added into the memory 39 and may be easily and quickly selected by the movie button 71. Similarly, the selected news-and-sports channels may be introduced or added into the memory 39 and may be easily and quickly selected by the news-and-sports button 72. Similarly, the selected combination channels may be introduced or added into the memory 39 and may be easily and quickly selected by the combination button 73. The users need not to select the required channel by depressing the buttons or keys in series. The displayer 36 may be used to show the channels entered or deleted or to show the other information.

Accordingly, the remote control device in accordance with the present invention includes one or more keys to select the required or the predetermined classified channels easily, the groups of selected channels may be stored in the memory and may be easily and quickly selected with a key or button.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A remote control device comprising:
   a housing including at least one button provided thereon,
   a processor unit received in said housing,
   a memory received in said housing and coupled to said processor unit,
   means for entering selected channels into said memory and to be controlled and selected by said at least one button, and
   an infrared emitting unit coupled to said processor unit, said infrared emitting unit including a transistor having a collector coupled to a diode and a first resistor, a second resistor coupled parallel to said diode and said first resistor and coupled to a base of said transistor, and a third resistor coupled to said base of said transistor.

2. The remote control device according to claim 1 further comprising a power unit and a low voltage detecting unit coupled to said processor unit.

3. The remote control device according to claim 1 further comprising a channel control unit coupled to said processor unit.

4. The remote control device according to claim 3, wherein said channel control unit includes four pairs of diodes and resistors coupled parallel to each other and coupled to said processor unit.

* * * * *